United States Patent Office 3,464,828
Patented Sept. 2, 1969

3,464,828
METHOD OF PREPARING PUFFED CEREAL PRODUCT
Patricia D. Cummisford, Minneapolis, Minn., assignor to General Mills, Inc., a corporation of Delaware
No Drawing. Filed Jan. 10, 1966, Ser. No. 519,463
Int. Cl. A23l 1/18
U.S. Cl. 99—82
10 Claims

ABSTRACT OF THE DISCLOSURE

Producing a puffed edible cereal product consisting of at least 10% dried corn particles, water and monoglycerides or alkali metal salts of saturated fatty acids of about 14 to 22 carbon atoms, by cooking cereal dough, forming the cooked dough into pellets, drying the pellets to a moisture content suitable for puffing and puffing the dried pellets.

---

The present invention relates to a cereal product of the puffed, ready-to-eat type and to the process of preparing said cereal product. More particularly, it relates to a puffed cereal product prepared from a dough derived from a substantial proportion of dried corn particles.

Puffed cereal products of the ready-to-eat breakfast food type have long been available to the consuming public. Such products are generally prepared by puffing whole cereal grains or by puffing pieces or pellets of cooked doughs prepared from various farinaceous materials. Products prepared from corn based doughs fall into this latter category and have been available to the consuming public for a substantial number of years.

The preparation of puffed ready-to-eat cereals from corn based doughs has presented various problems. Generally, the products are prepared by adding water to a farinaceous material containing a substantial proportion of dried corn particles (i.e. corn meal, corn flour, corn cones), cooking the dough, forming the cooked dough into pellets, drying the pellets to a moisture content suitable for puffing, puffing the dried pellets in a puffing gun and then, if desired, further drying the expanded pellets. One such process for preparing puffed, corn based cereal products is that disclosed in Collatz Patent 2,162,376. While the described process appears to be straight-forward and trouble-free, sticking and/or clustering of the dough pellets is often encountered. Sticking refers to tendencies of the extruded pellets to adhere to other pellets during drying, of the dried pellets to adhere to other dried pellets to adhere to other dried pellets during holding or storage intervals and of the dried pellets to stick to equipment and especially to the walls of the puffing gun. Another interrelated sticking problem is that of clustering. The puffed cereal leaves the puffing chamber in clumps or clusters in which two or more individual pieces are clumped or clustered into a larger unit. These clumps tend to remain intact and are not easily reduced to discrete units without considerable effort or without causing breakage of the individual puffed cereal pieces.

Methods have been devised for controlling the severity of the described sticking problem (including clustering) encountered in the production of cereal products from corn based cereal doughs. One such method involves chilling of the pellets prior to the puffing thereof. While such an operation does somewhat reduce the sticking and clustering tendencies of the pellets, it is costly. Thus additional equipment is required including storage facilities whre the pellets must be held for the time necessary to chill same to the desired degree. A second method is to coat the dried pellets with an edible oil. This procedure is not only costly since it introduces an additional step into the process but also has a tendency to yield a product having potential shelf-life problems due to the possibility of the oil developing a rancid flavor and the product developing a greasy surface appearance. In addition, the oil coated pellets cannot be successfully puffed in some puffing guns since the same employ added steam which washes the oil from the pellets and causes the gun to become substantially non-operable in a short period of time due to a build-up of pellets as a result of sticking of the pellets to the walls of the gun. It would be highly desirable to provide a corn based cereal dough which could be formed into pellets, dried and puffed without encountering the aforementioned sticking and clustering problems and without having to either chill or oil coat the pellets.

It is, accordingly, an object of the present invention to provide a novel puffed cereal product. Another object is to provide such a product from a corn based dough formulation. A further object of my invention is to provide a novel process for preparing a puffed cereal product from a corn based dough formulation. These and other objects will become apparent from the following detailed description.

I have now discovered that puffed cereals can be prepared from corn based dough formulations without encountering, or with a substantial reduction in, the sticking and/or clustering of the pellets if the dough contains a small amount of a monoglyceride of a saturated fatty acid of about 14 to 22 carbon atoms or an alkali metal salt of such saturated fatty acids. The process of my invention generally comprises the steps of forming a dough from dry dough-forming ingredients containing a substantial amount of dried corn particles, water and a small amount of the monoglyceride, salt or mixtures thereof, cooking the dough, forming pellets from the cooked dough, drying the pellets to a moisture content suitable for puffing and puffing the dried pellets. If desired, the puffed pellets can be further dried.

As indicated the dry dough forming ingredients used to make the dough contain a substantial proportion of dried corn particles. My invention has particular application to doughs prepared from dry ingredients which consist of at least about 10% by weight on a dry basis of the dried corn particles—i.e. corn meal, flour, cones. The invention is especially valuable for the production of puffed cereal products from dry ingredients which consist of 50 to 100% by weight of the dried corn particles. Other farinaceous materials can also be included. Representative of these materials are cereal flours or starches such as those of wheat (hard or soft), rice, tapioca, buckwheat, arrowroot, potato, oat, barley, rye, etc. Other materials can also be included such as salt, sugar, cocoa, malt, honey, dehydrated milk, non-fat milk solids, vegetable or animal oils or fats, yeast, anti-oxidants, vitamins, minerals and the like. Various other flavorants and colorants (dyes) etc. can be added.

Monoglycerides of saturated fatty acids of about 14 to 22 carbon atoms are commercially available materials and can be prepared by well-known procedures. One such method is by direct esterification of the saturated fatty acid with glycerine, followed by distillation to obtain a high purity monoglycerides mixture. Another method is by the glycerolysis of saturated vegetable and animal oils. A preferred monoglyceride is Myverol Type 18–07 (also sold under the trade name Myvaplex Type 601). Such product is commercially available and is an edible, chemically saturated monoglyceride composition prepared by interesterification and distillation from glycerine and completely hydrogenated cottonseed oil. This product comprises a mixture of monoglycerides at a concentration at least 90 weight percent in which the stearic acid and palmitic acid moieties predominate. The monoglycerides which are employed in this invention have a purity of at least about 85% by weight. Thus some di- and triglyceride materials can be tolerated.

The alkali metal salts of the saturated fatty acids of about 14 to 22 carbon atoms can also be prepared by well-known procedures and many of the same are commercially available. Such salts or soaps can be prepared, for example, by the reaction of the alkali metal hydroxide with the free fatty acid. A preferred salt is sodium stearate.

The described monoglycerides or salts are employed in amount sufficient to substantially reduce sticking (including clustering) of the pellets formed from the cooked corn based doughs. The amount of monoglycerides or salts employed will vary somewhat depending on the precise formulation being cooked, dried and puffed. Thus when the dry ingredients include a large proportion, such as 75% by weight, of the dried corn particles, amounts of about 1.0 to 2.0% by weight of the monoglycerides or salts have been found to give good results. With this same 75% formulation, ½% by weight of Myverol Type 18-07 monoglycerides was found to give very little improvement in stickiness properties of the cooked dough. At other levels of dried corn particles, other amounts of the monoglycerides or salts would likely be optimum. Thus the amount to be employed is that which substantially reduces, and in many cases eliminates, sticking (including clustering) of the extruded pellets during drying, handling and puffing. Mixtures of various monoglycerides or various salts can be employed as well as mixtures of the monoglycerides and the salts.

The dry ingredients are formed into a dough with water and the dough is cooked to gelatinize the starch in the farinaceous materials. Any method of cooking may be employed, but usually it is desirable to mix the dough in a jacketed mixer and cook the dough therein until the same has acquired the proper degree of gelatinization for the production of a desirable puffed product. The particular time of cooking depends somewhat upon the formulation being treated, the temperature employed, and the type of equipment used. In general, cooking of from ½ to 2 hours under atmospheric pressure in a jacketed vessel heated with steam at 5-20 pounds per square inch has been found satisfactory. Commercial equipment to perform the cooking operation under these conditions is readily available. Of course, the cooking can be carried out under pressure and at various temperatures and for various periods other than those specified above. Considerable variation is also possible in the quantity of water employed during the cooking operation. The minimum quantity of water which may be employed is that which will actually form a dough. Usually at least about 20-45% of moisture based on the weight of the dough is present at the time of cooking. Larger quantities of moisture may be employed. But since this moisture must be removed prior to puffing, the use of excess moisture is not desirable. Ordinarily a moisture content within the range of about 20-40% by weight of the dough has been found desirable.

After the dough has been cooked, it is shaped into any desired form of pellets for puffing. For the preparation of small pellets, the dough may be extruded in a wide variety of equipment and the extruded material cut off in the form of small pellets. The size and shape of the material formed from the dough depends upon the nature of the product desired. For ready-to-eat breakfast cereals it is usually desirable to form the dough into small pellets which will puff into the size of pieces conventionally employed for ready-to-eat breakfast cereals. Doughs having the moisture content previously described usually can be shaped without any adjustment of the moisture content.

Prior to puffing, the dough pellets or pieces should be adjusted to a suitable puffing moisture. Such moisture content varies somewhat depending upon the specific puffing apparatus and puffing condtions employed. Thus under some puffing conditions, a moisture content as low as about 8% by weight provides suitably puffed products. Under other conditions, the moisture content of the pellets can be 16% by weight and higher and yet yield suitably puffed products. A moisture content within the approximate range of 10 to 16% by weight is preferred. Under many conditions, pellets having a moisture content of 13 to 15% by weight provide optimum results. The precise moisture content also depends to some extent upon the nature of the dough formulation and accordingly the optimum moisture content can readily be determined for any given material. Any method of drying can be used to reduce the moisture content of the pellets. Various commercially available equipment can be used for the drying operation—i.e. rotary bed, drum, tray, belt driers. The pellets can also be further shaped during the drying thereof or after they have reached the desired moisture content. For example, they can be flattened somewhat by passage through cracking rolls.

The pellets after being dried are placed in a gun puffing apparatus of any suitable type such as a batch gun puffer of the barrel type. The pellets can also be preheated to temperatures of the order of 100 to 200° F. prior to being placed in the puffing gun. Steam or other inert gases can be used as the puffing gas. Similarly, the dried dough pellets can be expanded into a vacuum or into atmospheric pressure. Thus the pellets are conventionally puffed by sudden release from a confined area into an area having a larger volume and lower pressure. Generally, it is preferred to employ steam as the gas and expand into atmospheric pressure. Pressures which are particularly useful are 50 to 150 p.s.i. If steam is used in the puffing operation, or formed in the operation, the temperatures in the puffing apparatus will vary more or less with the pressure obtained. Temperatures of 400 to 650° F. have been found to give good results. The optimum pressure and temperature varies somewhat upon the specific dough formulation. Pressures of 80 to 120 p.s.i. and temperatures of 425 to 625° F. are especially preferred. One preferred method of puffing the pellets is to place same in the puffing gun which is heated to the designated temperatures, allow the steam pressure to develop by driving moisture from the pellets and then suddenly release the pellets to the atmosphere. The products of the present invention can also be puffed by the method and with the apparatus disclosed and claimed in Takuzo Tsuchiya, George Long and Kenneth Hreha application Ser. No. 56,046, filed Sept. 14, 1960 (now Patent No. 3,231,387) and entitled "Method and Apparatus For Continuous Puffing" which disclosure is incorporated herein by reference.

After the puffing operation, the puffed pellets may be further dried by conventional methods if desired. The pellets immediately after puffing normally have a moisture content of about 6-8%. It may be desirable to dry the product down to a moisture content in the range of about 2.5 to 4.0% to increase the stability and shelf life thereof. This, however, is unnecessary where the product is to be consumed in a short period of time and the shelf life and long term stability are not needed.

In order to further illustrate various features of the present invention and preferred embodiments thereof, the following examples are included. Unless otherwise indicated, all parts and percentages used herein are by weight.

EXAMPLE 1

A dough made up of the following ingredients in the following proportions by weight:

| | Parts |
|---|---|
| Yellow corn cones | 300.0 |
| Oat flour | 40.0 |
| Sugar (sucrose) | 22.8 |

|  | Parts |
|---|---|
| Wheat starch | 20.0 |
| Salt (NaCl) | 10.8 |
| Coconut oil | 5.6 |
| Monoglycerides (Mycerol Type 18-07) | 4.0 |

To the above ingredients were added 152 parts of water followed by mixing. The resulting moist, mealy-like mixture was fed into a jacketed mixer-coker heated with steam at 5–10 p.s.i. The temperature of the dough was raised to 102–110° C. and held at that temperature for about 40 minutes with continuous mixing. The resulting cooked dough was very easy to handle—not sticky. The cooker was clean internally when the dough was mechanically run-out of same. The cooked dough was cooled for about two minutes to a temperature of about 90° C. and then placed in a steam jacketed (10 p.s.i. steam) extruder. The dough was extruded through a die and cut into round pellets having a diameter of about ⅛ inch. The moisture content of the pellets was about 23.5% by weight. They were then tray dried at 100° C. to a moisture content of about 14% by weight. The pellets showed no tendency to clump or stick to each other or to the various pieces of apparatus. Ten gram samples of the pellets were loaded into a puffing gun (barrel rotated at 78 r.p.m.) and puffed at various internally developed steam pressures, times and temperatures as follows:

| Sample No. | Puff time (seconds in gun) | Steam pressure (p.s.i.) | Gun temperature, ° F. | |
|---|---|---|---|---|
|  |  |  | Pellets in | Pellets out |
| 1 | 194 | 120 | 460 | 575 |
| 2 | 140 | 80 | 425 | 550 |
| 3 | 157 | 100 | 465 | 575 |
| 4 | 111 | 90 | 485 | 575 |
| 5 | 118 | 90 | 485 | 585 |
| 6 | 108 | 90 | 550 | 600 |
| 7 | 108 | 90 | 550 | 615 |
| 8 | 112 | 90 | 550 | 600 |

None of these samples showed any significant sticking to each other or to the puffing gun. A few double pieces were blown from the gun, but as soon as they were touched, the pieces separated. The pieces had good volume being about 5–7 times the size of the unpuffed pellets. They were tan in color and had good flavor.

EXAMPLE 2

Example 1 was repeated except that the dough was cooked at 101–108° C. for about 44 minutes. Again the cooked dough was very plastic and easy to handle and the extruded pellets were free flowing. Ten gram samples were loaded into a puffing gun (barrel rotated at 75 r.p.m.) and puffed as follows:

| Sample No. | Puff time (seconds in gun) | Steam pressure (p.s.i.) | Gun temperature, ° F. | |
|---|---|---|---|---|
|  |  |  | Pellets in | Pellets out |
| 1 | 135 | 90 | 425 | 585 |
| 2 | 120 | 85 | 450 | 625 |
| 3 | 110 | 90 | 515 | 615 |
| 4 | 110 | 90 | 500 | 615 |
| 5 | 106 | 90 | 525 | 615 |

No clumps or clusters of pellets were found in these puffed samples and the pellets did not stick to each other or the gun to any significant extent. The volume of the puffed pellets was substantially the same as those of Example 1. The said pellets had good flavor and a slightly uneven tan to brownish color.

EXAMPLE 3

Example 1 was repeated except that the amount of monoglycerides was increased from 4.0 parts to 8.0 parts (about 2% by weight of the other dry ingredients) and the dough was cooked at 100–110° C. for 45 minutes. The resulting dough was plastic but somewhat tougher than the dough of Examples 1 and 2. It was not sticky and the extruded pellets were free-flowing. The moisture content of the extruded pellets was 19.4% by weight and this was reduced to 14% by weight by tray drying at 100° C. Ten gram samples were then puffed as in Example 1 at the following temperatures, internally developed steam pressures, and gun residence times:

| Sample No. | Puff time (seconds in gun) | Steam pressure (p.s.i.) | Gun temperature, ° F. | |
|---|---|---|---|---|
|  |  |  | Pellets in | Pellets out |
| 1 | 212 | 40 | 525 | 600 |
| 2 | 232 | 80 | 525 | 600 |
| 3 | 224 | 78 | 500 | 600 |
| 4 | 128 | 88 | 500 | 585 |
| 5 | 111 | 90 | 515 | 615 |
| 6 | 102 | 92 | 525 | 615 |
| 7 | 97 | 90 | 550 | 600 |
| 8 | 98 | 90 | 525 | 600 |
| 9 | 91 | 80 | 525 | 600 |
| 10 | 91 | 80 | 515 | 600 |

None of these samples showed sticking or clumping. Volume was good and substantially the same as the puffed pellets of Example 1. Flavor was also good. The puffed pellets had an uneven pale cream color with pale brown areas.

EXAMPLE 4

Example 1 was repeated except that the amount of monoglycerides was increased from 4.0 parts to 6.0 parts (about 1½% by weight of the other dry dough ingredients) and the dough was cooked at 101–110° C. for 45 minutes. The cooked dough was again easy to handle and showed no stick problem in the coker or extruder. The pellets were free-flowing and, when reduced from 19.6% by weight moisture to 14.0%, were puffed as follows (10 gram samples):

| Sample No. | Puff time (seconds in gun) | Steam pressure (p.s.i.) | Gun temperature, ° F. | |
|---|---|---|---|---|
|  |  |  | Pellets in | Pellets out |
| 1 | 189 | 60 | 450 | 550 |
| 2 | 135 | 80 | 485 | 550 |
| 3 | 128 | 90 | 500 | 565 |
| 4 | 121 | 90 | 450 | 535 |
| 5 | 103 | 90 | 465 | 550 |
| 6 | 96 | 90 | 465 | 550 |
| 7 | 97 | 90 | 465 | 550 |
| 8 | 98 | 90 | 435 | 535 |
| 9 | 118 | 100 | 450 | 550 |

None of the puffed pellets clumped or clustered and no significant sticking was encountered. The puffed product had the same good volume and flavor of the pellets of Example 1. However, the said pellets had some darker areas of coloration similar to the pellets of Example 3.

EXAMPLE 5

Example 1 was repeated except the water was increased from 152 parts to 180 parts and the dough was cooked at 100–109° C. for 41 minutes. Substantially the same good results were obtained as in Example 1. And in addition, the cooked dough was not quite as stiff and thus even easier to handle. The moisture content of the extruded pellets was about 27.5% before drying.

EXAMPLE 6

Example 5 was repeated except that the amount of water was increased to 208 parts. The resulting dough was more difficult to handle. However, when the extruded pellets were dried from a moisture content of about 34.0% by weight to 14% by weight and puffed, good results were obtained. The pellets did not stick to the gun and only a few clumps (2 and 3 pellets) were evident. Such clumps were apparently the result of the sticking of the wetter dough formulation at the point of extrusion and cutting of the extrudate.

EXAMPLE 7

Example 1 was essentially repeated except that the amount of water was 180 parts and the 5.6 parts coconut oil were omitted from the formulation. Substantially the same good results were obtained as in Example 1 on pellets dried to a moisture content of 15.6% by weight. At 11.9% moisture content, the puffed pellets had a slightly smaller volume or size.

EXAMPLE 8

Example 5 was repeated except that the 4.0 parts monoglycerides were replaced by 4.0 parts sodium stearate and the dough was cooked at 100–109° C. for 45 minutes. The resulting extruded pellets were dried to a moisture content of 14% by weight and then ten gram samples thereof puffed as follows:

| Sample No. | Puff time (seconds in gun) | Steam pressure (p.s.i.) | Gun temperature, °F. Pellets in | Gun temperature, °F. Pellets out |
|---|---|---|---|---|
| 1 | 210 | 40 | 500 | 550 |
| 2 | 150 | 80 | 475 | 550 |
| 3 | 120 | 100 | 500 | 565 |
| 4 | 120 | 110 | 485 | 550 |
| 5 | 110 | 120 | 500 | 550 |
| 6 | 80 | 100 | 485 | 550 |
| 7 | 90 | 110 | 485 | 550 |
| 8 | 105 | 120 | 485 | 550 |
| 9 | 110 | 120 | 500 | 550 |

The puffed pellets had good flavor, color and volume as in Example 5. No sticking or clumping was noted. The dough was somewhat stiffer than the dough of Example 5.

EXAMPLE 9

Example 5 was essentially repeated except that two parts of the monoglycerides were replaced by two parts of sodium stearate. Again no clumping or sticking of the pellets was noted and the puffed product had good volume, flavor and color.

EXAMPLE 10

Example 1 was repeated except that the 4.0 parts monoglycerides were eliminated from the formulation. The dough was cooked at 100–106° C. for about 45 minutes. The cooked dough was sticky and hard to handle but not as stiff as the dough of Example 1. The extruded pellets had a tendency to stick together into long chains. The moisture content thereof was reduced to 14% by weight (from 25.0%). The resulting dried pellets were stuck together and were rather difficult to separate without causing deformation or breakage thereof. Ten gram samples were puffed as follows:

| Sample No. | Puff time (seconds in gun) | Steam pressure (p.s.i.) | Gun temperature, °F. Pellets in | Gun temperature, °F. Pellets out |
|---|---|---|---|---|
| 1 | 220 | 80 | 450 | 600 |
| 2 | 110 | 80 | 450 | 565 |
| 3 | 120 | 80 | 425 | (1) |
| 4 | 90 | 80 | 510 | (1) |
| 5 | 95 | 80 | (1) | 550 |

[1] Not recorded.

The pellets stuck to the gun causing scorching. The pellets that did manage to blow out of the gun were very clumped. Spraying of the pellets with about 2% by weight coconut oil reduced the sticking problem and yielded puffed pellets which did not clump or cluster. The color of the oil sprayed samples was golden yellow and the pellets had good volume. However, as noted above, the oil spraying adds an additional costly step to the process and yields a product which has a tendency to have a shorter shelf life than an unoiled product. In addition, the oil sprayed product cannot be puffed satisfactorily in the continuous puffing gun described and claimed in the above-noted application of Tsuchiya, Long and Hreha. Thus under preferred conditions using added superheated steam, the oil washes off the pellets causing the continuous gun to malfunction after a very short period of operation due to the sticking of the pellets to the walls of the gun. The pellets minus the oil also cluster. In the absence of the added oil coating, the pellets stick together even before reaching the puffing step. In contrast, the pellets of the present invention can be puffed in the said continuous puffing gun using added superheated steam without difficulty.

The foregoing examples have been included to illustrate various preferred embodiments of the invention and are to be interpreted as limitations on the scope thereof. Many modifications will be apparent to those skilled in the art.

The embodiments of the present invention in which an exclusive property or privilege is claimed are defined as follows:

1. A process of producing an edible cereal product which comprises: forming a dough from dry dough forming ingredients consisting of at least 10% by weight dried corn particles, water and an addition agent selected from monoglycerides or alkali metal salts of saturated fatty acids of about 14 to 22 carbon atoms; cooking the dough; forming the cooked dough into pellets; drying the pellets to a moisture content suitable for puffing; and puffing the dried pellets by sudden release from a confined area to an area of larger volume and lower pressure, the amount of said addition agent being sufficient to substantially reduce sticking of the pellets.

2. The process of claim 1 wherein the dry dough forming ingredients consist of 50 to 100% by weight of the dried corn particles.

3. The process of claim 1 wherein the dry dough forming ingredients also comprise at least one additional farinaceous material and flavoring and coloring agents.

4. The process of claim 1 wherein the dry dough forming ingredients also comprise oat flour, salt, sugar and wheat starch.

5. The process of claim 1 wherein the pellets are dried to a moisture content of about 10 to 16% by weight prior to the puffing thereof.

6. The process of claim 1 wherein the addition agent is a monoglyceride.

7. The process of claim 1 wherein the addition agent is a monoglyceride derived from fully hydrogenated cottonseed oil.

8. The process of claim 1 wherein the addition agent is present in an amount of about 1.0 to 2.0% by weight of the dry dough forming ingredients.

9. The process of claim 1 wherein the addition agent is sodium stearate.

10. The process of claim 1 wherein the puffed pellets are further dried to a moisture content of less than about 4% by weight.

References Cited

UNITED STATES PATENTS

| | | | |
|---|---|---|---|
| 3,113,869 | 12/1963 | Lee | 99—85 |
| 3,246,990 | 4/1966 | Thompson et al. | 99—82 |
| 2,898,215 | 8/1959 | Ferrel | 99—80 XR |
| 2,162,376 | 6/1939 | Collatz | 99—82 |
| 2,653,098 | 9/1953 | Baer | 99—82 |
| 3,104,975 | 9/1963 | Bowman | 99—82 XR |

RAYMOND N. JONES, Primary Examiner

JAMES R. HOFFMAN, Assistant Examiner

PO-1050
(5/69)

UNITED STATES PATENT OFFICE
CERTIFICATE OF CORRECTION

Patent No. 3,464,828        Dated September 2, 1969

Inventor(s) Patricia D. Cummisford

It is certified that error appears in the above-identified patent and that said Letters Patent are hereby corrected as shown below:

Column 1, line 52, delete "to adhere to other dried pellets". Column 2, line 62, "acid" should read -- acids --; line 72, after "tion" insert -- of --. Column 4, line 70, after "dough" insert -- was --. Column 5, line 5, "Mycerol" should read -- Myverol --; line 9, "mixer-coker heated" should read -- mixe cooker being heated --. Column 6, line 32, "coker" should read -- cooker --. Column 8, line 16, after "are" insert -- not --.

SIGNED AND
SEALED
MAY 26 1970

(SEAL)
Attest:

Edward M. Fletcher, Jr.
Attesting Officer

WILLIAM E. SCHUYLER, JR.
Commissioner of Patents